April 26, 1949.     E. R. PRICE     2,468,706
BOOSTER FOR HYDRAULIC PRESSURE SYSTEMS
Filed Nov. 15, 1947
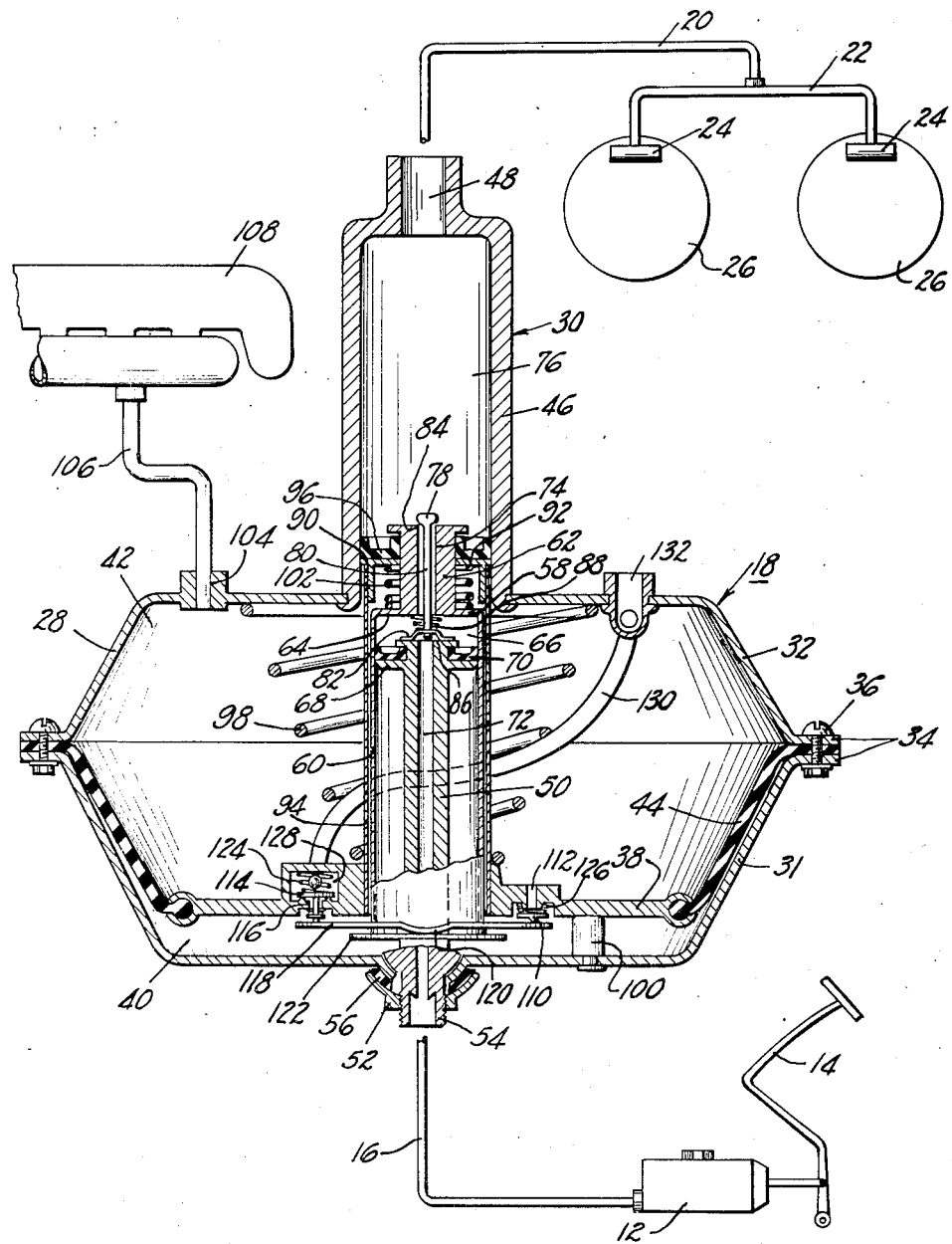
INVENTOR.
EARL R. PRICE
BY
T. J. Plante
ATTORNEY Patented Apr. 26, 1949

2,468,706

UNITED STATES PATENT OFFICE 2,468,706

BOOSTER FOR HYDRAULIC PRESSURE SYSTEMS

Earl R. Price, South Bend, Ind., assignor to Bendix Aviation Corporation, South Bend, Ind., a corporation of Delaware Application November 15, 1947, Serial No. 786,231

10 Claims. (Cl. 60—54.5)

This invention relates to boosters for hydraulic pressure systems, such as might be used, for example, in applying vehicle brakes. The booster unit is of the type which is connected to the master cylinder and to the wheel cylinders, or motors, by hydraulic lines and which is actuated by displacement of fluid from the master cylinder, the master cylinder pressure assisting the booster-developed pressure in applying the brakes.

An object of the present invention is to provide an improved booster unit of the type mentioned in the preceding paragraph, wherein the cost of manufacturing the unit is lessened, and at the same time the overall dimensions of a unit having a given capacity are reduced. Cost reduction is obtained by minimizing the number of parts in the booster unit, for example, by eliminating the usual reaction diaphragm associated with the control valve mechanism and obtaining the reaction directly from the hydraulic fluid in the system.

While units having direct hydraulic reaction have heretofore been proposed, they have always tended to be excessively long because of a separation of the input and output hydraulic chambers. The present invention overcomes this disadvantage by locating certain of the hydraulic operating parts within the casing of the power cylinder. Furthermore, the present invention makes it possible to arrange the hydraulic operating parts in a new relationship by, in effect, reversing the functions of the piston and cylinder at the input side of the hydraulic part of the booster unit. In particular, an intermediate plunger member is provided which functions as a liquid-displacing plunger on the output side of the booster unit and as a movable cylinder on the input side of the booster unit.

Other objects and advantages of the present invention will become apparent during the following description of an illustrative embodiment, reference being had therein to the accompanying drawing, in which the figure is a vertical sectional view of my improved booster unit. The master cylinder and wheel cylinders, to which the booster unit is adapted to be connected, are shown diagrammatically. The size of the hydraulic cylinder which form a part of the booster unit has been exaggerated, in order to provide a clearer showing of the structure.

Referring to the single figure, a conventional master cylinder 12, which is operated by a pedal 14, is hydraulically connected by means of a conduit 16 to the novel booster unit 18. At the outlet side, the booster unit is connected by means of conduit 20 and branch conduits 22 to wheel cylinders, or motors, 24, which are arranged to operate brakes 26. It will, of course, be readily apparent that the assistance of the booster can be used in any type of control system. Its usefulness is in no way limited to braking systems, although that constitutes its most important field at present.

The booster unit comprises a power cylinder 28 and a hydraulic cylinder 30. The power cylinder 28 may be of any preferred type, i. e. it may utilize whatever source of power is available. In the illustrated version of the invention, the power cylinder is of the differential air pressure type, and is specifically a vacuum power cylinder in which the maximum pressure differential across the piston is provided by having vacuum on one side of the piston and air at atmospheric pressure on the other side of the piston. The power cylinder casing may comprise two cup-shaped shells 31 and 32, which have peripheral flanges 34 secured together by a plurality of fastening members 36. A pressure responsive movable wall, or piston, 38 divides the power cylinder casing into two chambers 40 and 42, the periphery of piston 38 being sealed by means of a flexible disphragm 44, the outer circumference of which is secured between the flanges 34 of shells 31 and 32, and the inner circumference of which is secured to the piston 38.

The hydraulic cylinder 30 consists of a hollow tubular member 46, which is mounted on the upper end of the power cylinder, and which has a discharge port 48 at its upper end adapted to be connected to conduit 20.

Mounted on the lower end, or wall, of power cylinder 28, is a hollow stationary piston member 50. Piston member 50 extends into the interior of the power cylinder toward the hydraulic cylinder 30, and is secured to shell 31 by means of a threaded clamp 52 which engages the threaded end portion 54 of the stationary piston member. In order to permit a certain amount of angular movement of stationary piston member 50 relative to the power cylinder while at the same time providing a seal at the entrance of chamber 40, a rubber washer 56 is placed between clamp 52 and the power cylinder casing. Provision for possible angular movement of stationary piston member 50 is necessary in order to compensate for any misalignment of the moving parts of the booster unit due to manufacturing tolerances.

A floating plunger member 58 encircles member 50 and extends through the center of the power cylinder. Plunger member 58 has a tubular portion 60, into which stationary piston member 50 extends, and also has a reduced diameter end portion 62, which extends into hydraulic cylinder 30 to operate as a fluid-displacing member therein. The inside front wall 64 of plunger member 58, which is formed where the tubular portion 60 joins the end portion 62, is acted upon by the pressure of hydraulic fluid in chamber 66. Chamber 66 is formed between end wall 64 of plunger member 58 and the enlarged diameter head portion 68 of member 50.

Head portion 68 of member 50 provides a reaction surface for the fluid acting on plunger 58, and carries a seal 70 which prevents fluid from escaping past the periphery of head portion 68. It will be noted that a very slight area of contact is provided between head portion 68 of member 50 and the inside wall of tubular portion 60 of plunger member 58. The reason for this is to permit relative angular movement between members 58 and 50, if such movement is required owing to slight misalignment of the parts.

Chamber 66 is in communication with master cylinder 12 through passage 72 provided in member 50, and through the inlet port provided by end portion 54 of member 50. The end portion 62 of plunger member 58 has a passage 74 extending therethrough, which is adapted to connect chamber 76 in hydraulic cylinder 30 with chamber 66. A valve member 78 is arranged to control passage 74. Valve member 78 has a stem 80 which carries a collar 82. In released position of the parts, the valve member 78 is held away from valve seat 84 by engagement of collar 82 with the front face 86 of stationary piston member 50. A spring 88, which is compressed between wall 64 of plunger member 58 and collar 82 of valve stem 80, exerts a force tending to move valve element 78 to its seat 84. As soon as plunger member 58 has moved upwardly a sufficient distance, spring 88 will cause valve member 78 to seat, thereby preventing flow of fluid from chamber 76 to chamber 66.

In displacing fluid from chamber 76 to operate the motors 24, the work done by end portion 62 of plunger member 58 is assisted and augmented by the work of piston member 90. Piston member 90 has an annular liquid-displacing portion 92 which reciprocates in the bore of hydraulic cylinder 30 and which encircles the end portion 62 of plunger member 58. Piston member 90 also has a tubular portion 94 which connects the annular liquid-displacing portion 92 to piston 38 in power cylinder 28, the center of piston 38 being open to accommodate stationary piston member 50 and plunger member 58. The liquid-displacing portion 92 of piston member 90 carries a seal 96, which prevents the escape of fluid from chamber 76 either along the periphery of piston member 90 or along the periphery of end portion 62 of plunger member 58.

As will be more fully explained in the subsequent description of the operation of the booster unit, piston member 90 is power operated, whereas plunger member 58 is operated by manually developed pressure.

A return spring 98, which is compressed between shell 32 of the power cylinder and piston 38, normally retains the piston in released position, a member 100 providing an abutment to limit the return movement of piston 38. A spring 102, which is compressed between piston member 90 and plunger member 58, urges plunger member 58 to released position, piston member 90 being returned to released position by spring 98, owing to its direct mechanical connection to power piston 38. Chamber 42 of power cylinder 28, which is the constant vacuum chamber, is connected by means of port 104 and pipe 106 with the conventional intake manifold 108. Chamber 40 of the power cylinder is the control chamber, and is capable of being selectively connected either to the vacuum source or to air at atmospheric pressure.

The valve mechanism whereby the pressures in chamber 40 are controlled is preferably carried by power piston 38. This valve mechanism may consist of a valve element 110 controlling the vacuum port 112 in the piston, a valve element 114 controlling the atmosphere port 116 in the piston, and a lever, or walking beam, 118 which controls operation of valve elements 110 and 114. Lever 118 has an annular portion which encircles the tube 60, and has two oppositely extending arms which engage the respective valve elements 110 and 114.

Provided at opposite sides of the annular portion of lever 118 are fulcruming portions 120, which engage an annular flange 122 formed at the end of tube 60. Valve element 114 is urged toward seated, or closed, position by a spring 124. Valve element 110 is urged away from its seat by a spring 126, which should be slightly weaker than spring 124, in order to permit valve 110 to close before valve 114 opens. With valve 110 unseated, as shown, chamber 40 of the power cylinder is connected to chamber 42. Therefore, vacuum is present in chamber 40, and piston 38 is "submerged" in vacuum. During operation of the power cylinder, when valve element 114 is unseated, chamber 40 is connected to a chamber 128 provided in power piston 38. Chamber 128, in turn, is connected by means of a flexible hose 130 to a port 132 which opens to the atmosphere.

The booster unit 18 is intended to be installed in such a way that its axis is on a vertical line, as illustrated in the figure. The advantage of such an installation lies in the fact that the hydraulic system can be bled in the normal manner, in spite of the fact that the booster unit has been inserted. If the axis of the booster unit were on a horizontal line, it would be necessary to provide a separate bleeding port in the booster unit.

Operation of the hydraulic system utilizing my improved booster unit is as follows: When the brake pedal 14 is depressed, hydraulic fluid under pressure is displaced from master cylinder 12, through conduit 16 and passage 72 in member 50, to chamber 66. As long as passage 74 remains open, fluid in chamber 66 can move toward chamber 76, and thence through conduits 20 and 22 to the motors 24. Owing to the fact that the effective area of end portion 62 of plunger member 58 is less than the effective area of wall 64, pressure produced by operation of master cylinder 12 provides a resultant force on plunger member 58 tending to move it upwardly into chamber 76. As plunger member 58 moves away from stationary piston member 50, valve member 78 closes passage 74, under the influence of spring 88. Further flow of hydraulic fluid from chamber 66 to chamber 76 is therefore prevented during the remainder of the pressure stroke.

As plunger member 58 moves upwardly, under the influence of pressure developed in master cylinder 12, the flange 122 on the plunger member 60 causes lever 118 first to move valve 110 to its seat, closing the vacuum port, and then to unseat valve 114, connecting chamber 40 to the atmosphere. As air moves into chamber 40, a pressure differential is developed over power piston 38, moving the piston upwardly, overcoming the resistance of return spring 98. Movement of power piston 38 on its upward stroke causes piston member 90 to displace hydraulic fluid from chamber 76, thereby assisting in applying the brakes. The total work done in applying the brakes is the sum of the work done by manually operated plunger member 58 and by power operated piston member 90.

The operator, when depressing the pedal 14, receives a "reaction," or "feel," which resists operation of the pedal with a force less than, but proportional to, the force exerted on the brakes. The ratio of the pressure per unit area developed in master cylinder 12 to the pressure per unit area developed in chamber 76 is equal to the ratio of the effective area of end portion 62 of plunger member 58 to the effective area of wall 64 of said plunger member. Another way of stating the same thing is to say that the manually developed pressure in master cylinder 12 results in a higher unit pressure in chamber 76, owing to the difference in the areas of wall 64 and end portion 62 of plunger member 58. The additional displacement of hydraulic fluid required to satisfactorily operate the brakes is provided by the power-operated annular piston 90.

As the members 58 and 90 move upwardly on their pressure stroke, additional fluid must be displaced from master cylinder 12 in order to hold valve 114 in open position. As soon as movement of pedal 14 ceases, the power piston 38 overtakes plunger member 58 and brings the control valve mechanism to "lapped" position, in which both valve elements 114 and 110 are closed, the booster unit being maintained at the selected stage of operation.

When pressure on pedal 14 is removed, the pressure in chamber 66 will be reduced, and plunger member 58 will be urged downwardly both by spring 102 and by the pressure in chamber 76. This movement of plunger member 58 will permit spring 126 to unseat valve member 110, connecting chamber 40 to the vacuum source. When the pressures in chambers 40 and 42 of the power cylinder have been equalized, the return spring 98 will retract power piston 38, bringing with it annular piston 90. The entire assembly will return to released position, with the parts in the position shown in the figure. Passage 74 will be opened to provide communication between the wheel cylinders and chamber 76, on the one hand, and master cylinder 12, on the other hand, thus permitting changes in the volume of fluid in the hydraulic system to be compensated for by the master cylinder reservoir.

If, when it is desired to operate the brakes, the power piston 38 should, for any reason fail to operate, the brakes will be applied by hydraulic fluid displaced from master cylinder 12, which will pass through passages 72 and 74, unseating valve 78, if necessary. Movement of plunger member 58 relative to piston member 90 is limited by the shoulder 134 provided on piston member 90. Therefore, if it is desired to displace additional fluid after maximum power has been developed by the power cylinder, additional master cylinder pressure can force plunger member 58 into engagement with shoulder 134 and move the entire fluid-displacing assembly.

From the foregoing description, it will be seen that a large percentage of the working parts of the booster unit have been placed inside the confines of power cylinder 28. For given displacement and pressure output requirements, my improved booster unit can be incorporated in a much shorter space than any previous booster units of the "hydraulic reaction" type. Furthermore, it will be apparent that the entire assembly is so designed and arranged as to be compact in structure and relatively inexpensive to manufacture.

Although this invention has been described in connection with a certain specific embodiment, the principles involved are susceptible of numerous other applications that will readily occur to persons skilled in the art.

I claim:

1. For use in a hydraulic pressure system which includes a master cylinder and a motor, a booster unit comprising a differential air pressure power cylinder, a hydraulic cylinder mounted on one end of the power cylinder, said hydraulic cylinder having a discharge port adapted to be connected to the motor, a hollow stationary piston member secured to the opposite end of the power cylinder and extending into the interior of the power cylinder toward the hydraulic cylinder, said stationary piston member having an inlet port adapted to be connected to the master cylinder, a floating plunger member having a tubular portion into which said stationary piston member extends and having a reduced diameter substantially solid end portion extending into the aforementioned hydraulic cylinder, the inside front wall of the floating plunger member which is formed where the tubular portion joins the end portion being acted upon by the pressure of the hydraulic fluid which passes through the hollow stationary piston member, the end portion of said floating plunger member having a passage therethrough which in released position permits communication between the master cylinder and the motor, a spring-pressed valve member carried by the floating plunger member which closes said passage when the latter member moves on its pressure stroke, a pressure-responsive movable wall in the power cylinder having a central opening through which the stationary piston member and the floating plunger member extend, said pressure responsive movable wall dividing the power cylinder into two chambers, two valves operatively associated with ports in the movable wall to control the pressure in one of the chambers, a lever which is arranged to control operation of said valves and which is actuated by movement of the floating plunger member relative to the movable wall, and a piston member having a tubular portion connected to the movable wall and an annular liquid-displacing portion extending into the hydraulic cylinder, said annular liquid-displacing portion encircling the end portion of the floating plunger member, the work of displacing fluid under pressure from the hydraulic cylinder being performed cooperatively by the power-operated annular portion of the last-named piston member and the master-cylinder-operated end portion of the floating plunger member.

2. For use in a hydraulic pressure system which includes a master cylinder and a motor, a booster unit comprising a differential air pressure power cylinder, a hydraulic cylinder mounted on one end of the power cylinder, said hydraulic cylinder having a discharge port adapted to be connected to the motor, a hollow stationary piston member secured to the opposite end of the power cylinder and extending into the interior of the power cylinder, said stationary piston member having an inlet port adapted to be connected to the master cylinder, a floating plunger member having a tubular portion into which said stationary piston member extends and having a reduced diameter end portion extending into the aforementioned hydraulic cylinder, the inside front wall of the floating plunger member which is formed where the tubular portion joins the end portion being acted upon by the pressure of the hydraulic fluid which passes through the hollow stationary piston member, the end portion of said floating plunger member having a passage therethrough which in released position permits communication between the master cylinder and the motor, a spring-pressed valve member carried by the floating plunger member which closes said passage when the latter member moves on its pressure stroke, a pressure-responsive movable wall in the power cylinder having a central opening through which the stationary piston member and the floating plunger member extend, said pressure responsive movable wall dividing the power cylinder into two chambers, two valves operatively associated with ports in the movable wall to control the pressure in one of the chambers, an element which is arranged to control operation of said valves and which is actuated by movement of the floating plunger member relative to the movable wall, and a piston member having a tubular portion connected to the movable wall and an annular liquid-displacing portion extending into the hydraulic cylinder, said annular liquid-displacing portion encircling the end portion of the floating plunger member.

3. For use in a hydraulic pressure system which includes a master cylinder and a motor, a booster unit comprising a power cylinder, a hydraulic cylinder mounted on one end of the power cylinder, said hydraulic cylinder having a discharge port adapted to be connected to the motor, a hollow stationary piston member secured to the opposite end of the power cylinder and extending into the interior of the power cylinder, said stationary piston member having an inlet port adapted to be connected to the master cylinder, a plunger member having a tubular portion into which said stationary piston member extends and having a reduced diameter end portion extending into the aforementioned hydraulic cylinder, the inside front wall of said plunger member which is formed where the tubular portion joins the ends portion being acted upon by the pressure of the hydraulic fluid which passes through the hollow stationary piston member, the end portion of said plunger member having a passage therethrough which in released position permits communication between the master cylinder and the motor, a valve member which closes said passage during the pressure stroke, a pressure-responsive movable wall in the power cylinder having a central opening through which the stationary piston member and said plunger member extend, said pressure responsive movable wall dividing the power cylinder into two chambers, valve mechanism adapted to control the pressure in one of the chambers, an element which is arranged to control operation of said valve mechanism and which is actuated by movement of said plunger member, and a piston member having a tubular portion connected to the movable wall and an annular liquid-displacing portion extending into the hydraulic cylinder, said annular liquid-displacing portion encircling the end portion of said plunger member.

4. For use in a hydraulic pressure system which includes a master cylinder and a motor, a booster unit comprising a power cylinder, a hydraulic cylinder mounted on one end of the power cylinder, said hydraulic cylinder having a discharge port adapted to be connected to the motor, a hollow stationary piston member secured to the opposite end of the power cylinder and extending into the interior of the power cylinder, said stationary piston member having an inlet port adapted to be connected to the master cylinder, a plunger member having a tubular portion into which said stationary piston member extends and having a reduced diameter end portion extending into the aforementioned hydraulic cylinder, the inside front wall of said plunger member which is formed where the tubular portion joins the end portion being acted upon by the pressure of the hydraulic fluid which passes through the hollow stationary piston member, a pressure-responsive movable wall in the power cylinder having a central opening through which the stationary piston member and said plunger member extend, said pressure responsive movable wall dividing the power cylinder into two chambers, valve mechanism adapted to control the pressure in one of the chambers, an element which is arranged to control operation of said valve mechanism and which is actuated by movement of said plunger member, and a piston member having a tubular portion connected to the movable wall and an annular liquid-displacing portion extending into the hydraulic cylinder, said annular liquid-displacing portion encircling the end portion of said plunger member.

5. For use in a hydraulic pressure system which includes a master cylinder and a motor, a booster unit comprising a power cylinder, a hydraulic cylinder mounted on one end of the power cylinder, said hydraulic cylinder having a discharge port adapted to be connected to the motor, a hollow stationary piston member secured to the opposite end of the power cylinder and extending into the interior of the power cylinder, said stationary piston members having an inlet port adapted to be connected to the master cylinder, a plunger member having a tubular portion into which said stationary piston member extends and having a reduced diameter end portion extending into the aforementioned hydraulic cylinder, the inside front wall of said plunger member which is formed where the tubular portion joins the end portion being acted upon by the pressure of the hydraulic fluid which passes through the hollow stationary piston member, a pressure-responsive movable wall in the power cylinder having a central opening through which the stationary piston member and said plunger member extend, valve mechanism which is adapted to control the pressure in one of the chambers and which is actuated by movement of said plunger member, and a piston member having a tubular portion connected to the movable wall and an annular liquid-displacing portion extending into the hydraulic cylinder, said annular liquid-displacing portion encircling the end portion of said plunger member.

6. A booster unit comprising a power cylinder, a hydraulic cylinder mounted on one end of the power cylinder, said hydraulic cylinder having a discharge port adapted to be connected to a motor, a stationary piston member secured to the opposite end of the power cylinder and extending into the interior of the power cylinder, said stationary piston member having a passage longitudinally therethrough, the outer end of which is adapted to be connected to a master cylinder, a plunger member having a tubular portion into which said stationary piston member extends and having a reduced diameter end portion extending into the hydraulic cylinder, the inside front wall of said plunger member which is formed where the tubular portion joins the end portion being acted upon by the pressure of the hydraulic fluid which passes through the stationary piston member, the end portion of said plunger member having a passage therethrough which in released position permits communication between the inlet port and the discharge port, a valve member which closes said passage during the pressure stroke, a pressure-responsive movable wall in the power cylinder which divides the latter into two chambers, valve mechanism which is adapted to control the pressure in one of the chambers and which is actuated by movement of said plunger member, and a piston member having a tubular portion connected to the movable wall and an annular liquid-displacing portion extending into the hydraulic cylinder, said annular liquid-displacing portion encircling the end portion of said plunger member.

7. A booster unit comprising a power cylinder, a hydraulic cylinder mounted on one end of the power cylinder, said hydraulic cylinder having a discharge port adapted to be connected to a motor, a stationary piston member secured to the opposite end of the power cylinder and extending into the interior of the power cylinder, said stationary piston member having a passage extending longitudinally therethrough, the outer end of which is adapted to be connected to a master cylinder, a plunger member having a tubular portion into which said stationary piston member extends and having a reduced diameter end portion extending into the hydraulic cylinder, the inside front wall of said plunger member which is formed where the tubular portion joins the end portion being acted upon by the pressure of the hydraulic fluid which passes through the stationary piston member, a pressure-responsive movable wall in the power cylinder which divides the latter into two chambers, valve mechanism which is adapted to control the pressure in one of the chambers and which is actuated by movement of said plunger member, and a piston member having a tubular portion connected to the movable wall and an annular liquid-displacing portion extending into the hydraulic cylinder, said annular liquid-displacing portion encircling the end portion of said plunger member.

8. A booster unit comprising a power cylinder, a hydraulic cylinder mounted on one end of the power cylinder, said hydraulic cylinder having a discharge port adapted to be connected to a motor, a stationary piston member secured to the opposite end of the power cylinder and extending into the interior of the power cylinder, said stationary piston member having a passage extending longitudinally therethrough, the outer end of which is adapted to be connected to a master cylinder, a plunger member having a tubular portion into which said stationary piston member extends and having a reduced diameter end portion extending into the hydraulic cylinder, the inside front wall of said plunger member which is formed where the tubular portion joins the end portion being acted upon by the pressure of the hydraulic fluid which passes through the stationary piston member, a pressure-responsive movable wall in the power cylinder, valve mechanism which is adapted to control the pressure acting on the movable wall and which is actuated by movement of said plunger member, and a piston member having a tubular portion connected to the movable wall and an annular liquid-displacing portion extending into the hydraulic cylinder, said annular liquid-displacing portion encircling the end portion of said plunger member.

9. A booster unit comprising a power cylinder, a hydraulic cylinder at one end of the power cylinder, said hydraulic cylinder having a discharge port adapted to be connected to a motor, a stationary piston member secured to the opposite end of the power cylinder and extending into the interior of the power cylinder, said stationary piston member having a passage extending longitudinally therethrough, the outer end of which is adapted to be connected to a master cylinder, a plunger member having a tubular portion into which said stationary piston member extends and having a reduced diameter liquid-displacing end portion, said plunger member being acted upon by the pressure of the hydraulic fluid which passes through the stationary piston member, a pressure-responsive movable wall in the power cylinder, valve mechanism which is adapted to control the pressure acting on the movable wall and which is actuated by movement of said plunger member, and a piston member having a tubular portion connected to the movable wall and an annular liquid-displacing portion extending into the hydraulic cylinder and encircling the end portion of said plunger member.

10. A booster unit comprising a power cylinder, a hydraulic cylinder at one end of the power cylinder, said hydraulic cylinder having a discharge port adapted to be connected to a motor, a stationary piston member secured to the opposite end of the power cylinder and extending into the interior of the power cylinder, said stationary piston member having a passage extending longitudinally therethrough, the outer end of which is adapted to be connected to a master cylinder, a plunger member having a tubular portion into which said stationary piston member extends and having a reduced diameter liquid-displacing end portion, said plunger member being acted upon by the pressure of the hydraulic fluid which passes through the stationary piston member, a pressure-responsive movable wall in the power cylinder, and a piston member having a tubular portion connected to the movable wall and an annular liquid-displacing portion extending into the hydraulic cylinder and encircling the end portion of said plunger member.

EARL R. PRICE.

No references cited

Certificate of Correction

April 26, 1949

Patent No. 2,468,706

EARL R. PRICE

It is hereby certified that errors appear in the printed specification of the above numbered patent requiring correction as follows:

Column 1, line 48, for "form" read *forms*; column 2, line 27, for "disphragm" read *diaphragm*; column 8, line 41, for "members" read *member*; line 71, after "passage" insert *extending*;
and that the said Letters Patent should be read with these corrections therein that the same may conform to the record of the case in the Patent Office.

Signed and sealed this 17th day of January, A. D. 1950.

[SEAL]

THOMAS F. MURPHY,
*Assistant Commissioner of Patents.*